US012731181B2

(12) United States Patent
Price et al.

(10) Patent No.: US 12,731,181 B2
(45) Date of Patent: Sep. 8, 2026

(54) OFFERING AUTOMOBILE RECOMMENDATIONS FROM GENERIC FEATURES LEARNED FROM NATURAL LANGUAGE INPUTS

(71) Applicant: Capital One Services, LLC, McLean, VA (US)

(72) Inventors: Micah Price, Plano, TX (US); Stephen Wylie, Carrollton, TX (US); Habeeb Hooshmand, McKinney, TX (US); Jason Hoover, Grapevine, TX (US); Geoffrey Dagley, McKinney, TX (US); Qiaochu Tang, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/584,792

(22) Filed: Feb. 22, 2024

(65) Prior Publication Data

US 2024/0193669 A1 Jun. 13, 2024

Related U.S. Application Data

(60) Continuation of application No. 17/094,088, filed on Nov. 10, 2020, now Pat. No. 11,915,293, which is a (Continued)

(51) Int. Cl.

*G06Q 30/0601* (2023.01)
*G06F 16/9538* (2019.01)

(Continued)

(52) U.S. Cl.

CPC ..... *G06Q 30/0631* (2013.01); *G06F 16/9538* (2019.01); *G06N 7/01* (2023.01); *G06N 20/00* (2019.01)

(58) Field of Classification Search

None

See application file for complete search history.

(56) References Cited

U.S. PATENT DOCUMENTS 10,346,893 B1 7/2019 Duan et al.
2012/0016678 A1* 1/2012 Gruber ................ G06F 16/9537 704/E21.001

(Continued)

FOREIGN PATENT DOCUMENTS

JP 2018045694 A 3/2018

OTHER PUBLICATIONS

T. Ghorpade and L. Ragha, "Featured based sentiment classification for hotel reviews using NLP and Bayesian classification," 2012 International Conference on Communication, Information & Computing Technology (ICCICT), Mumbai, India, 2012, pp. 1-5, doi: 10.1109/ICCICT.2012.6398136. (Year: 2012).*

*Primary Examiner* — Michelle T Kringen
(74) *Attorney, Agent, or Firm* — KDW Firm PLLC

(57) ABSTRACT

Various embodiments are generally directed to techniques to provide specific vehicle recommendations to generic user requests. A method for providing the specific vehicle recommendation includes: receiving a generic automobile request from a user, applying a machine learning model (MLM) trained by a corpus of reviews to the received request, and generating, by the MLM, a recommendation for at least one specific automobile feature based on the generic automobile request.

23 Claims, 9 Drawing Sheets

Related U.S. Application Data division of application No. 16/254,504, filed on Jan. 22, 2019, now Pat. No. 10,867,338.

(51) Int. Cl.

| | |
|---|---|
| ***G06N 7/01*** | (2023.01) |
| ***G06N 20/00*** | (2019.01) |

(56) References Cited

U.S. PATENT DOCUMENTS

| | | | | |
|---|---|---|---|---|
| 2013/0290905 | A1* | 10/2013 | LuVogt | G06N 3/006 715/835 |
| 2014/0280145 | A1* | 9/2014 | Heit | G06F 16/285 707/737 |
| 2015/0356270 | A1* | 12/2015 | Devarakonda | G16H 50/70 705/3 |
| 2017/0329872 | A1 | 11/2017 | Dispensa et al. | |
| 2019/0026815 | A1* | 1/2019 | Zhou | G06Q 30/0203 |
| 2019/0087882 | A1* | 3/2019 | Wollmer | G06Q 30/0609 |
| 2020/0034362 | A1 | 1/2020 | Galitsky | |

* cited by examiner

Figure 3A:
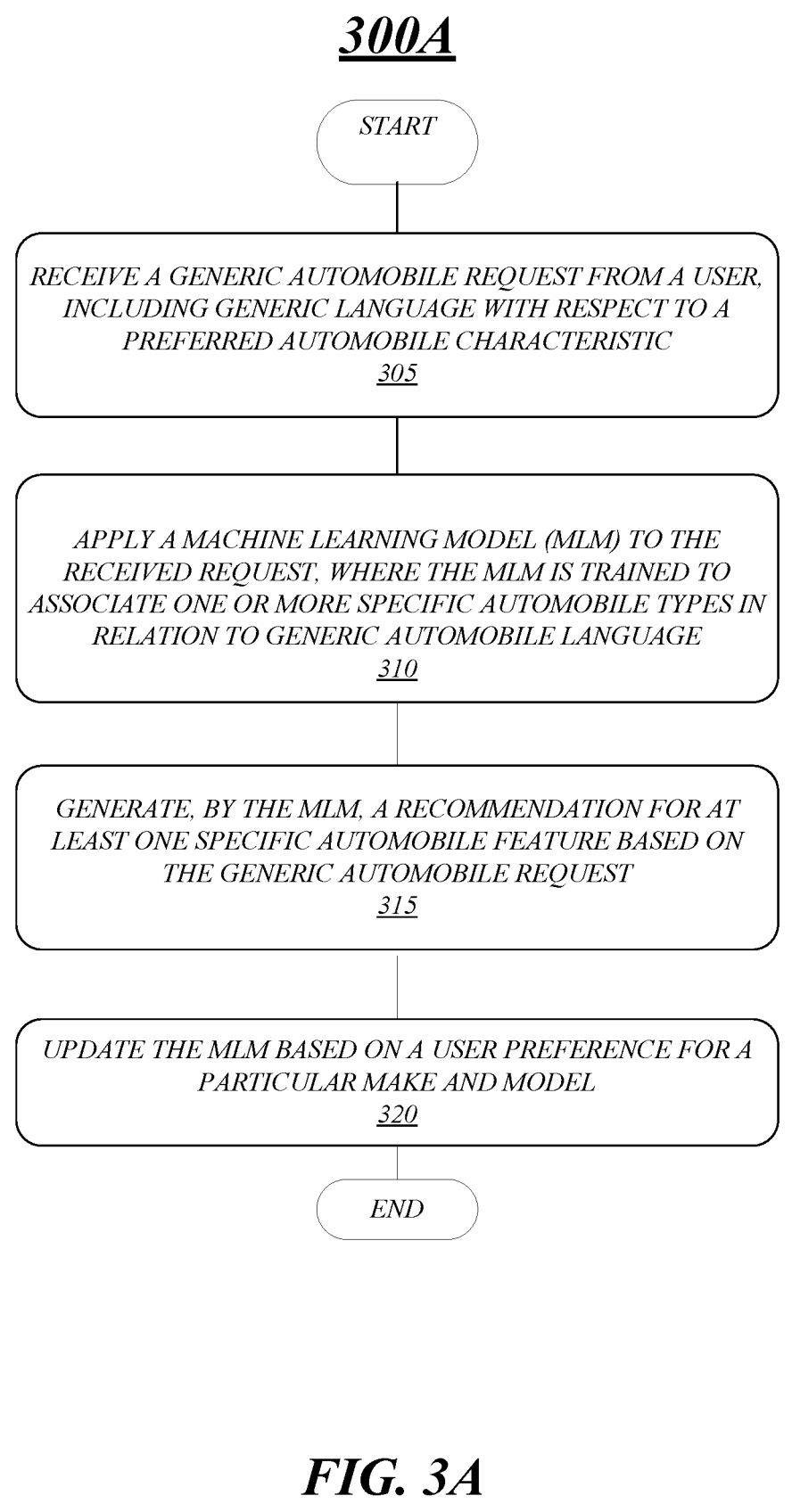

300A

START

RECEIVE A GENERIC AUTOMOBILE REQUEST FROM A USER, INCLUDING GENERIC LANGUAGE WITH RESPECT TO A PREFERRED AUTOMOBILE CHARACTERISTIC
305

APPLY A MACHINE LEARNING MODEL (MLM) TO THE RECEIVED REQUEST, WHERE THE MLM IS TRAINED TO ASSOCIATE ONE OR MORE SPECIFIC AUTOMOBILE TYPES IN RELATION TO GENERIC AUTOMOBILE LANGUAGE
310

GENERATE, BY THE MLM, A RECOMMENDATION FOR AT LEAST ONE SPECIFIC AUTOMOBILE FEATURE BASED ON THE GENERIC AUTOMOBILE REQUEST
315

UPDATE THE MLM BASED ON A USER PREFERENCE FOR A PARTICULAR MAKE AND MODEL
320

END

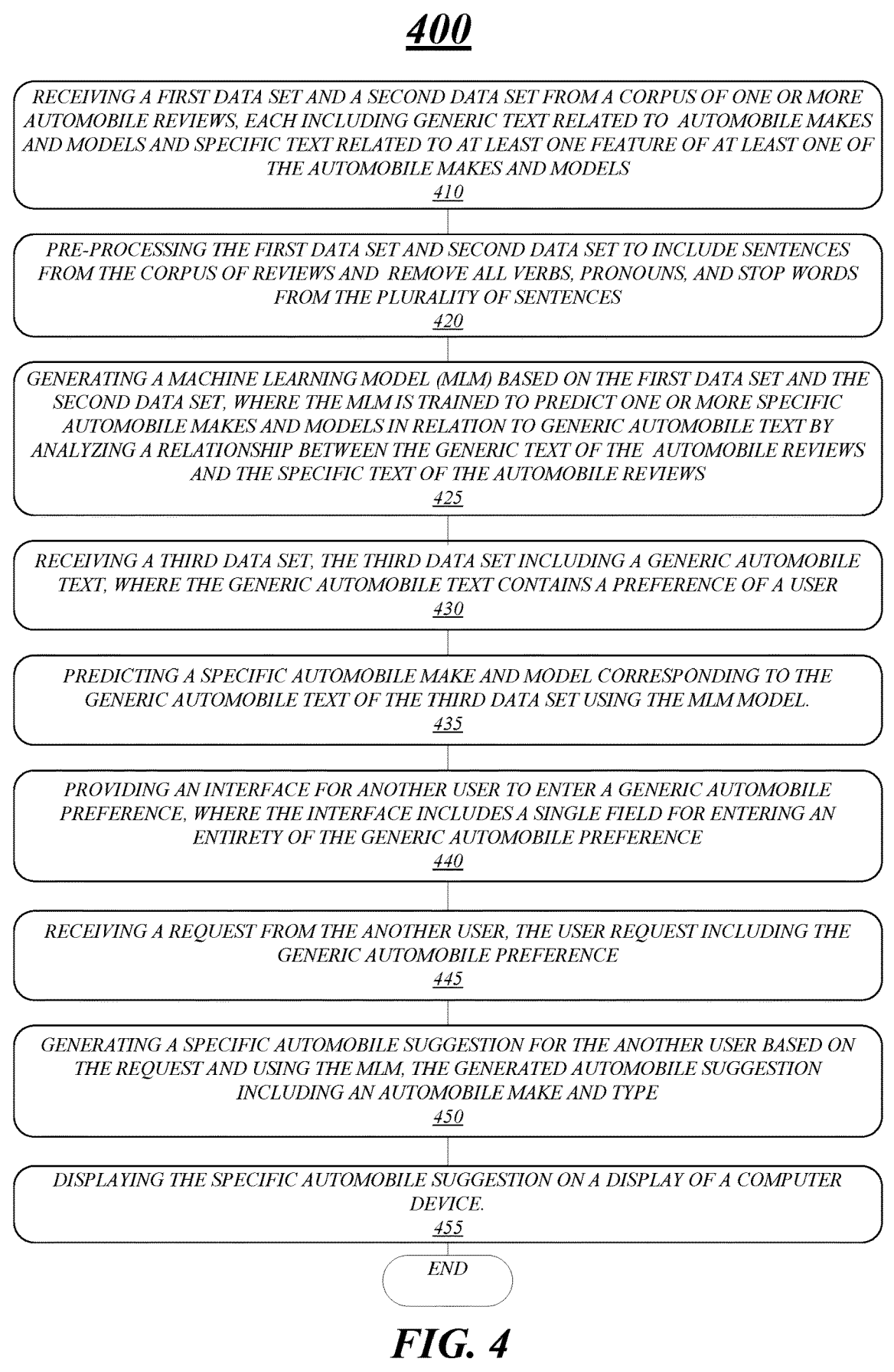

RECEIVING A FIRST DATA SET AND A SECOND DATA SET FROM A CORPUS OF ONE OR MORE AUTOMOBILE REVIEWS, EACH INCLUDING GENERIC TEXT RELATED TO AUTOMOBILE MAKES AND MODELS AND SPECIFIC TEXT RELATED TO AT LEAST ONE FEATURE OF AT LEAST ONE OF THE AUTOMOBILE MAKES AND MODELS
410

PRE-PROCESSING THE FIRST DATA SET AND SECOND DATA SET TO INCLUDE SENTENCES FROM THE CORPUS OF REVIEWS AND REMOVE ALL VERBS, PRONOUNS, AND STOP WORDS FROM THE PLURALITY OF SENTENCES
420

GENERATING A MACHINE LEARNING MODEL (MLM) BASED ON THE FIRST DATA SET AND THE SECOND DATA SET, WHERE THE MLM IS TRAINED TO PREDICT ONE OR MORE SPECIFIC AUTOMOBILE MAKES AND MODELS IN RELATION TO GENERIC AUTOMOBILE TEXT BY ANALYZING A RELATIONSHIP BETWEEN THE GENERIC TEXT OF THE AUTOMOBILE REVIEWS AND THE SPECIFIC TEXT OF THE AUTOMOBILE REVIEWS
425

RECEIVING A THIRD DATA SET, THE THIRD DATA SET INCLUDING A GENERIC AUTOMOBILE TEXT, WHERE THE GENERIC AUTOMOBILE TEXT CONTAINS A PREFERENCE OF A USER
430

PREDICTING A SPECIFIC AUTOMOBILE MAKE AND MODEL CORRESPONDING TO THE GENERIC AUTOMOBILE TEXT OF THE THIRD DATA SET USING THE MLM MODEL.
435

PROVIDING AN INTERFACE FOR ANOTHER USER TO ENTER A GENERIC AUTOMOBILE PREFERENCE, WHERE THE INTERFACE INCLUDES A SINGLE FIELD FOR ENTERING AN ENTIRETY OF THE GENERIC AUTOMOBILE PREFERENCE
440

RECEIVING A REQUEST FROM THE ANOTHER USER, THE USER REQUEST INCLUDING THE GENERIC AUTOMOBILE PREFERENCE
445

GENERATING A SPECIFIC AUTOMOBILE SUGGESTION FOR THE ANOTHER USER BASED ON THE REQUEST AND USING THE MLM, THE GENERATED AUTOMOBILE SUGGESTION INCLUDING AN AUTOMOBILE MAKE AND TYPE
450

DISPLAYING THE SPECIFIC AUTOMOBILE SUGGESTION ON A DISPLAY OF A COMPUTER DEVICE.
455

END

FIG. 4

*MACHINE LEARNING SYSTEM 506*

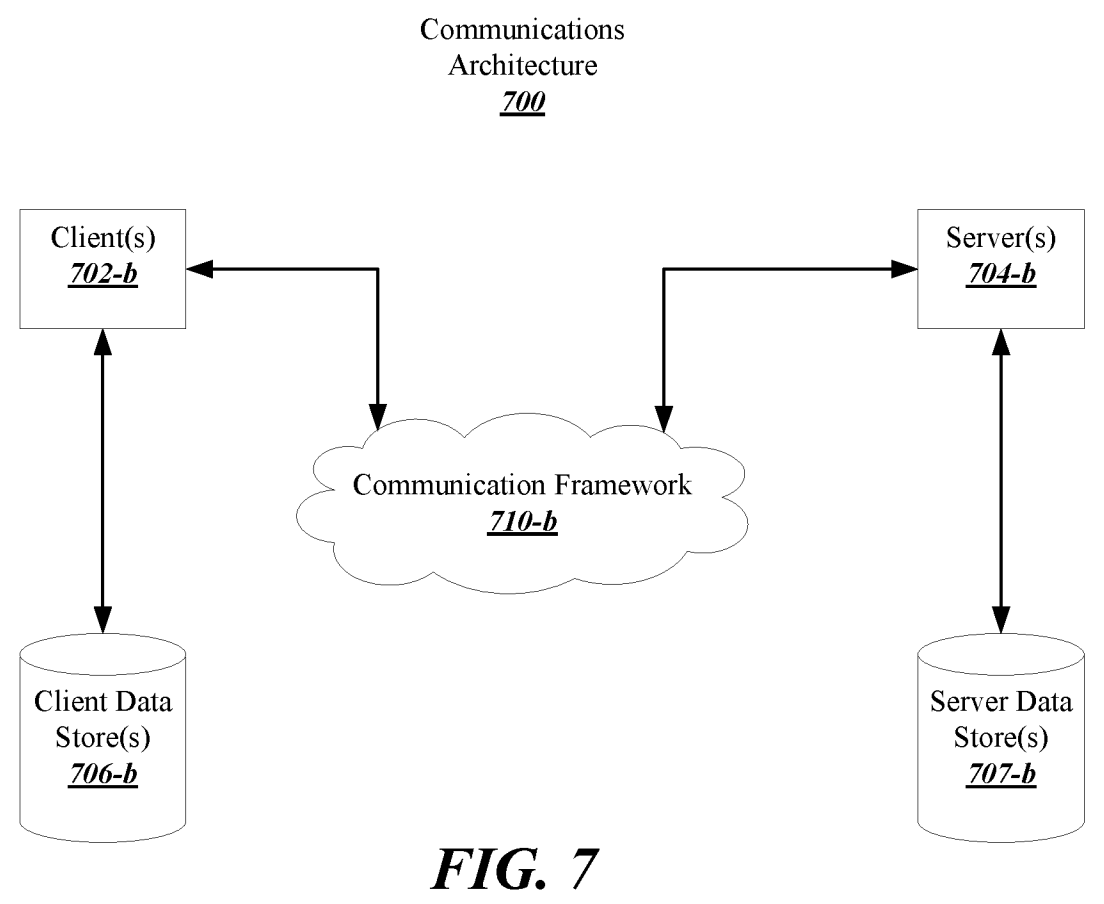

Communications Architecture 700

Client(s) 702-b

Client Data Store(s) 706-b

Communication Framework 710-b

Server(s) 704-b

Server Data Store(s) 707-b

*FIG. 7*

OFFERING AUTOMOBILE RECOMMENDATIONS FROM GENERIC FEATURES LEARNED FROM NATURAL LANGUAGE INPUTS

CROSS-REFERENCE TO RELATED APPLICATIONS

This application is a continuation of U.S. patent application Ser. No. 17/094,088, filed Nov. 10, 2020, now U.S. Pat. No. 11,915,293, which is a divisional of U.S. patent application Ser. No. 16/254,504, filed on Jan. 22, 2019, now U.S. Pat. No. 10,867,338, all entitled "OFFERING AUTOMOBILE RECOMMENDATIONS FROM GENERIC FEATURES LEARNED FROM NATURAL LANGUAGE INPUTS". The contents of the aforementioned patent applications are incorporated herein by reference in their entireties.

BACKGROUND

The present embodiments relate to machine learning, and more particularly machine learning to provide automobile information to users.

Electronic requests, for information or otherwise, made by users for products and services are prevalent in the current marketplace, but current services for making such requests, including search engines, suffer in the quality of delivering information concerning products and services, especially if a request employs generic language and it is the intent of the user to obtain information about a specific product. Accordingly, there is a need to improve the quality of responses associated with electronic search requests, including in the automobile context.

SUMMARY

One aspect of the present disclosure includes an apparatus for providing a vehicular recommendation to one or more users. The apparatus including: receive a generic automobile request from a user, the user request including generic language with respect to at least one automobile characteristic, apply a machine learning model (MLM) to the received request, where the MLM is trained, using a data set based on a corpus of one or more automobile reviews, to associate one or more specific automobile makes and models in relation to generic language, and generate, by the MLM, a recommendation for at least one specific automobile feature based on the generic automobile request.

Another aspect of the present disclosure includes a computer implemented method for providing a vehicular recommendation to one or more users. The method includes: receiving a first data set and a second data set from a corpus of one or more expert or user automobile reviews, each of the first data set and the second data set comprising generic text related to a plurality of automobile makes and models and specific text related to at least one feature of at least one of the plurality of automobile makes and models, where the generic text of the corpus of one or more expert or user automobile reviews is related to the specific text of the corpus of the one or more expert or user automobile reviews, generating, by at least one computer processor, a machine learning model (MLM) based on the first data set and the second data set, where the MLM is trained to predict one or more specific automobile makes and models in relation to generic automobile text by analyzing a relationship between the generic text of the corpus of one or more expert or user automobile reviews and the specific text of the corpus of one or more expert or user automobile reviews, and where the processing of the first data set enhances the accuracy of a predictive capacity of the MLM, including enhancing a prediction of a specific automobile make and model associated with the second data set, and where the processing of the second data set further enhances the predictive capacity of the MLM, receiving a third data set, the third data set comprising a generic automobile text, where the generic automobile text contains a preference of a user, and predicting a specific automobile make and model corresponding to the generic automobile text of the third data set using the MLM model.

Yet another aspect of the present disclosure includes a non-transitory computer-readable storage medium storing computer-readable program code executable by a processor to provide a vehicular recommendation to one or more users. The computer-readable program code executable by a processors including the ability to receive a generic automobile request from a user, the user request including generic language with respect to at least one automobile feature, apply a word-frequency based machine learning model (MLM) to the received user request, where the MLM is trained, by processing a data set based on a corpus of one or more automobile reviews, to associate one or more specific automobile makes and models in relation to generic language, and generate, by the MLM, a recommendation for a specific automobile make and model based on the generic automobile request.

BRIEF DESCRIPTION OF THE DRAWINGS

FIG. 4 illustrates an example of a processing flow for providing a vehicular recommendation according to at least one embodiment of the present disclosure.

FIG. 7 illustrates an embodiment of a communications architecture useful with at least one embodiment of the present disclosure.

DETAILED DESCRIPTION

Figure 1:
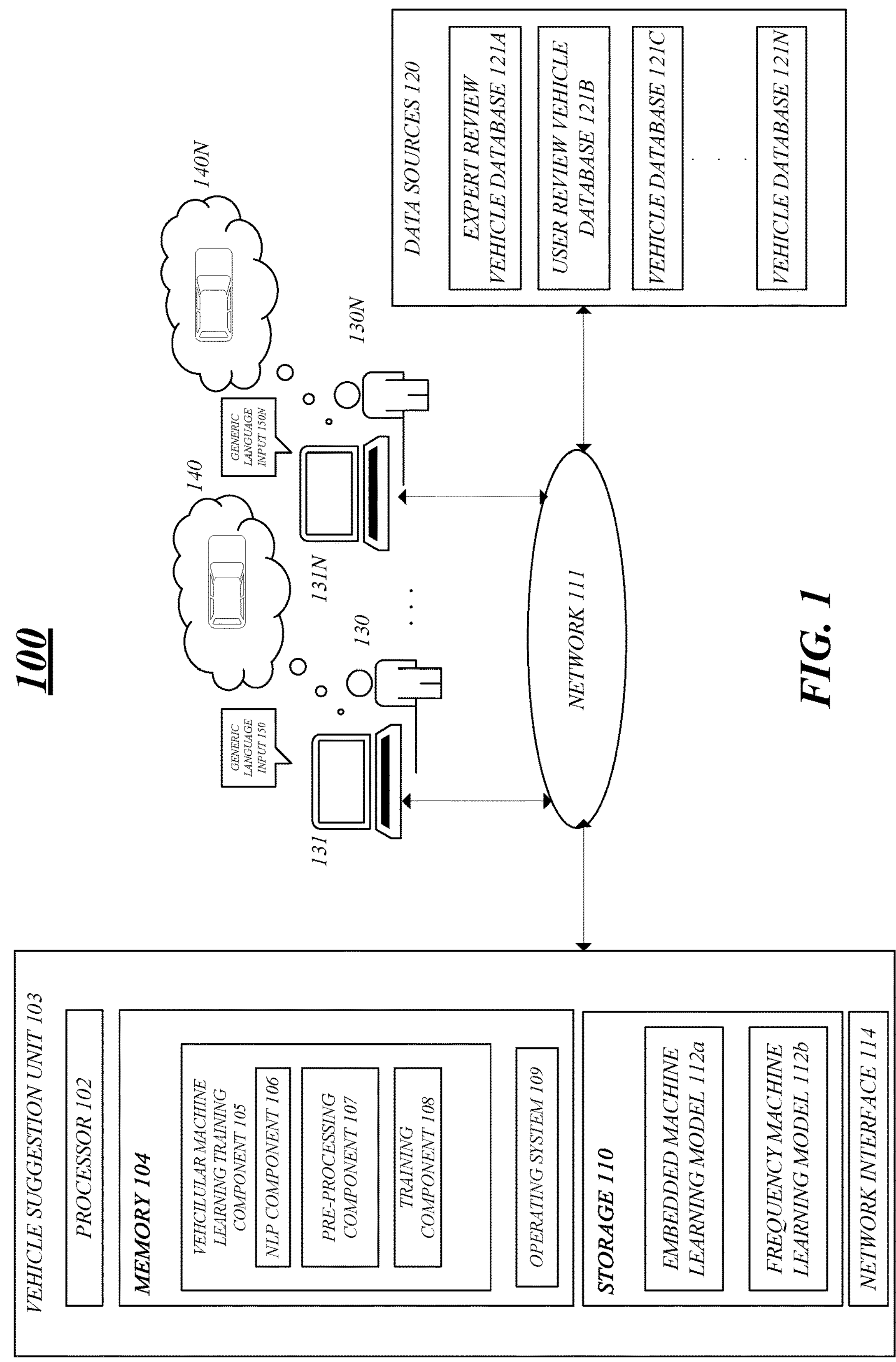
FIG. 1 illustrates an example of a system for providing vehicular information according to at least one embodiment of the present disclosure.

Various embodiments are generally directed to techniques, systems, and processing flows to improve the functionality of natural language systems and processors in processing generic user requests with respect to automobiles, such as cars, motorcycles, boats or any other suitable vehicle associated with transportation. One or more embodiments include a vehicle suggestion system that can receive and process a generic request for automobile information and provide a specific automobile suggestion to a user. In one or more embodiments, the vehicle suggestion system includes a component that generates a machine learning model using a corpus of automobile information, such as automobile expert or user reviews. The machine learning model can be any suitable machine learning model type, such as an embedded model (embedded machine learning model) and/or a word-frequency model (word frequency machine learning model). Irrespective of the type of model used, in one or more embodiments the machine learning model(s) is trained to associate generic language with language related to specific automobile features (a specific language related to the specific automobile features), specific automobile types, and/or specific automobile makes and models. In one or more embodiments, the machine learning model and associated components can output a probability distribution that a particular generic word or phrase is associated with a particular automobile feature, automobile type, and/or automobile make and model, e.g., the likelihood that the automobile feature, automobile type, and/or automobile make and model is a preferred automobile feature, automobile type, and/or automobile make and model of the user making the generic request.

In one or more embodiments, the natural language processing enhancement(s) provided by the machine learning model, including the ability to receive generic automobile input and provide a specific automobile output or suggestion (directed at user preferences), permit one or more users to enter a generic automobile information request by a single uniform input, either through a chatbot or a single field in a proper electronic medium, such as a search engine or search field contained in a website offering services, including the sale and financing of automobiles.

In one or more embodiments, in addition to learning and making adjustments based on the corpus of automobile or vehicle information, such as expert or user reviews of vehicles and vehicle information, the vehicular suggestion systems and/or other suitable systems, and components associated therewith, can incorporate user feedback as part of the learning process, including qualifiers provided by a user at the onset of the request and with respect to specific limitations, e.g. cost, location, mechanical features, etc. and/or post-processing feedback that adjusts the machine learning models based on an ultimate automobile selection by a user or users.

One or more of the embodiments as discussed above and elsewhere herein offers an advantage over other search engine systems and techniques at least because of providing a trained machine learning model trained for use in one context, e.g. predicting specific automobiles from descriptions in expert or user reviews, where the machine learning model can be applied in a second context, e.g. providing a vehicular recommendation to one or more users, which provides more range for a single trained model and conserves computer resources by minimizing training time. Another advantage that can be offered by one or more embodiments as discussed herein is the ability to offer a single interface for a user to enter a generic language request for a vehicle or vehicle feature, and a system being able to provide a recommendation based on the input.

Reference is now made to the drawings, wherein like reference numerals are used to refer to like elements. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example of a vehicular suggestion system 100 that can provide a specific automobile suggestion in response to a generic input by a user. The vehicular suggestion system 100 can also provide a single-entry point to enter the entirety of the generic input by the user and can provide an output that is a distribution of particular vehicular or automotive features and the likelihood that the automotive features correspond to the generic input, e.g., a distribution based on a likelihood that specific vehicular or automotive features are what the user would want with respect to the generic language. The "units" or "components" described in the system, whether contained in memory or otherwise employed therein, can be any suitable software, logic (hardware or software), or hardware element specifically configured to perform or be used in the performance of one or more tasks or functions as discussed herein.

In one or more embodiments, the vehicular suggestion system 100 can include a vehicle suggestion unit 103, which in turn includes one or more processors 102, memory 104, storage 110 and a network interface 114. The one or more processors 102 can be any suitable software or hardware computer components for carrying out any operation as discussed herein. The memory 104 can be any suitable component or unit for storing protocols, information, algorithms, and/or instructions for execution by the one or more processors, e.g., the memory 104 may be any volatile and/or non-volatile memory capable of storing information during and/or for execution of instructions. The devices, systems, sources, units and/or components of the vehicle suggestion unit 103 can be coupled to a network 111, e.g., the Internet, via one or more wired and/or wireless network links, and can be accessed by one or more network interfaces 114.

In one or more embodiments, the vehicle suggestion unit 103 can interact with one or more users or clients 130 . . . 130N (and associated user/client computing devices 131 . . . 131N, e.g. a laptop, mobile phone, tablet, or desktop computer) via a network interface 114 that can access the network 111, and the vehicle suggestion unit 103 can interact with one or more data databases or data sources 120 also via the network interface accessing the network 111, where in one or more embodiments the one or more data sources can include an expert review vehicle database (or expert review database) 121A, a user review vehicle database (or user review database) 121B, and vehicle databases 121C . . . 121N.

In one or more embodiments, the memory 104 can include a vehicular machine learning training component 105 and an operating system 109, where the operating system 109 can be any suitable operating system compatible with system 100. In one or more embodiments, the vehicular machine learning training component 105 can further include a natural language processing component ("NLP") 106, a pre-processing component 107, and a training component 108. In one or more embodiments, the one or more components of the vehicle suggestion unit 103 process generic natural language inputs 150 . . . 150N from the one or more users 130 . . . 130N and based on information processed from data sources or databases 120, provide a specific vehicular suggestion 140 . . . 140N to the one or more users 130 . . . 130N via a display associated with the one or more user computing devices 131 . . . 131N.

In one or more embodiments, the vehicle suggestion unit 103 is configured to provide a chatbot to the one or more users 130 . . . 130N via the one or more user computing devices 131 . . . 131N, where the chatbot provides general questions to the one or more users 130 . . . 130N about what vehicle type, feature, or make and model the one or more users 130 . . . 130N are interested in, where the one or more users 130 . . . 130N provide a generic response, e.g., 150, 150N, to the chatbot, and where the chatbot, as configured by the vehicle suggestion unit 103, provides a specific vehicular suggestion to one or more users 130 . . . 130N based on the input.

In one or more embodiments, whether a chatbot scheme is used or whether the vehicle suggestion unit 103 can be configured to cause the display of the computing devices 131 . . . 131N to provide a single field that can handle the entirety of a generic request provided by the one or more users 130 . . . 130N, the functionality of the overall system 100 is improved by having a single interface that can accommodate the entire user request, as opposed to requiring multiple fields, where each field requires a specific feature to be searched in a database in order to provide a specific vehicle suggestion to the one or more users 130 . . . 130N.

Embodiments are not limited in the above manner, and the above system is merely an exemplary embodiment for implementing one or more features of the present disclosure.

In one or more embodiments, the NLP component 106 may receive and process a natural language input from the expert review vehicle database 121A, the user vehicle review database 121B, and/or the vehicle databases 121C . . . 121N. The natural language input can be in text form or any other suitable form for processing by the NLP component 106.

In one or more embodiments, the expert review vehicle database 121A may have generic language provided by experts concerning vehicles and associated features, e.g. "a family-friendly vehicle" or "a vehicle that will make your friends jealous," etc. The generic language can be part of a review that associates the general language with a particular vehicular or automotive feature, e.g., an automobile with a V-6 engine, or a specific make and model provided by a particular manufacturer. For example, "an automobile with a V-6 engine will make your friends jealous" or "Model X made by manufacturer Y is a family-friendly vehicle" or "Model X made by manufacturer Y is a family-friendly vehicle because it has large cargo space," etc. The vehicle(s) discussed in the expert review vehicle database 121A can be automobiles, such as cars, motorcycles, boats, planes, or any other system(s) for facilitating mechanical transportation from one point to another. In one or more embodiments, the database 121A can be directed exclusively to cars with the reviews being provided by individuals with an established expertise in the automotive field, such as mechanics, individuals with years of writing experience for particular automotive publications, etc.

Similarly, in one or more embodiments, the user review vehicle database 121B may have generic language provided by vehicle users concerning vehicles and associated features, e.g. "my vehicle is a road-buster" or "my friends love this car," etc. In one or more embodiments, the generic language may be part of a review that associates the general language with a particular vehicular or automotive feature, e.g. fuel efficiency (a specific metric associated therewith), engine size, or horsepower, or a specific make and model provided by a particular manufacturer. For example, "my friends love my car because it has a V-6 engine" or "my Model X made by manufacturer Y is a family-friendly vehicle" or "my Model X made by manufacturer Y is a family-friendly vehicle because it has large cargo space," etc. The vehicle(s) discussed in the user review vehicle database 121B can be automobiles, such as cars, motorcycles, boats, planes, or any other system(s) for facilitating mechanical transportation from one point to another. In one or more embodiments, the database 121B can be directed exclusively to cars with the reviews being provided by individuals that own, owned, used, have used, or otherwise experienced particular automobiles and/or vehicles.

In one or more embodiments, the vehicle databases 121C . . . 121N can be additional expert review vehicle databases, user review vehicle databases, databases containing the location of vehicles for sale, the price range of vehicles generally or based on location, e.g., nationally vs. a specific location, such as a city or town, vehicle safety ratings, reviews for vehicles by customers, or any other information related to vehicles. As with database 121A, the vehicle(s) discussed in databases 121C . . . 121N can be automobiles, such as a car, motorcycles, boats, planes, or any other system(s) for facilitating mechanical transportation from one point to another, where in one or more embodiments, the databases 121C . . . 121N are exclusively related to cars.

In one or more embodiments, the NLP component 106 can have a filtering mechanism to ensure that the database 121A is in fact an expert review vehicle database, where the filtering mechanism can be a pre-configuration by a system designer, e.g. directing the system to a known expert publication database publicly available over the Internet, a matching mechanism that matches known expert reviewer names to a database (not shown) of known names for providing expert reviews, a threshold mechanism that looks for a certain number of known reviewers in the corpus of the database 121A before determining that the corpus of one or more expert reviews is an expert review repository (or for a certain number of assertions that particular reviews are expert reviews), any other suitable mechanism for making a determination that the expert review vehicle database 121A is in fact sufficiently populated with information that can be considered as expert reviews, or any combination therewith.

Similarly, in one or more embodiments, the NLP component 106 can have a filtering mechanism to ensure that the database 121B is in fact a user review database, where the filtering mechanism can be a pre-configuration by a system designer, e.g. directing the system to a known user publication or comment database publicly available over the Internet, a matching mechanism that looks for media evidence that a particular user owns or has experienced a particular automobile (such as a picture or video using the vehicle), a threshold mechanism that looks for a certain number of community approvals with respect to one or more users, or any other suitable mechanism for making a determination that the expert review vehicle database 121B is in fact sufficiently populated with information that can be considered as user reviews, or any combination therewith.

Figure 2A:
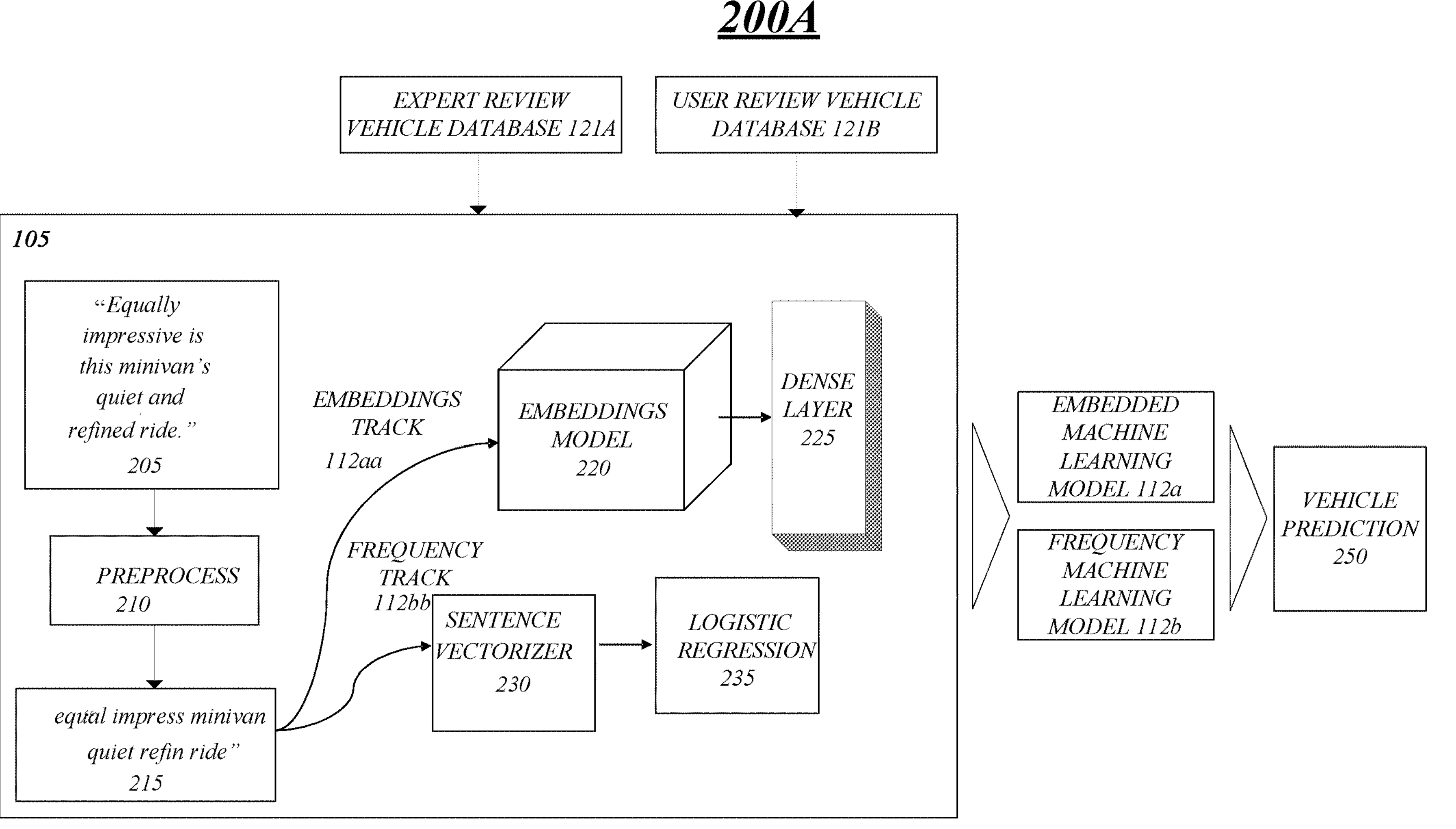
FIG. 2A/2B illustrate examples of training a machine learning model and a system for providing vehicular information according to at least one embodiment of the present disclosure.
Figure 2B:
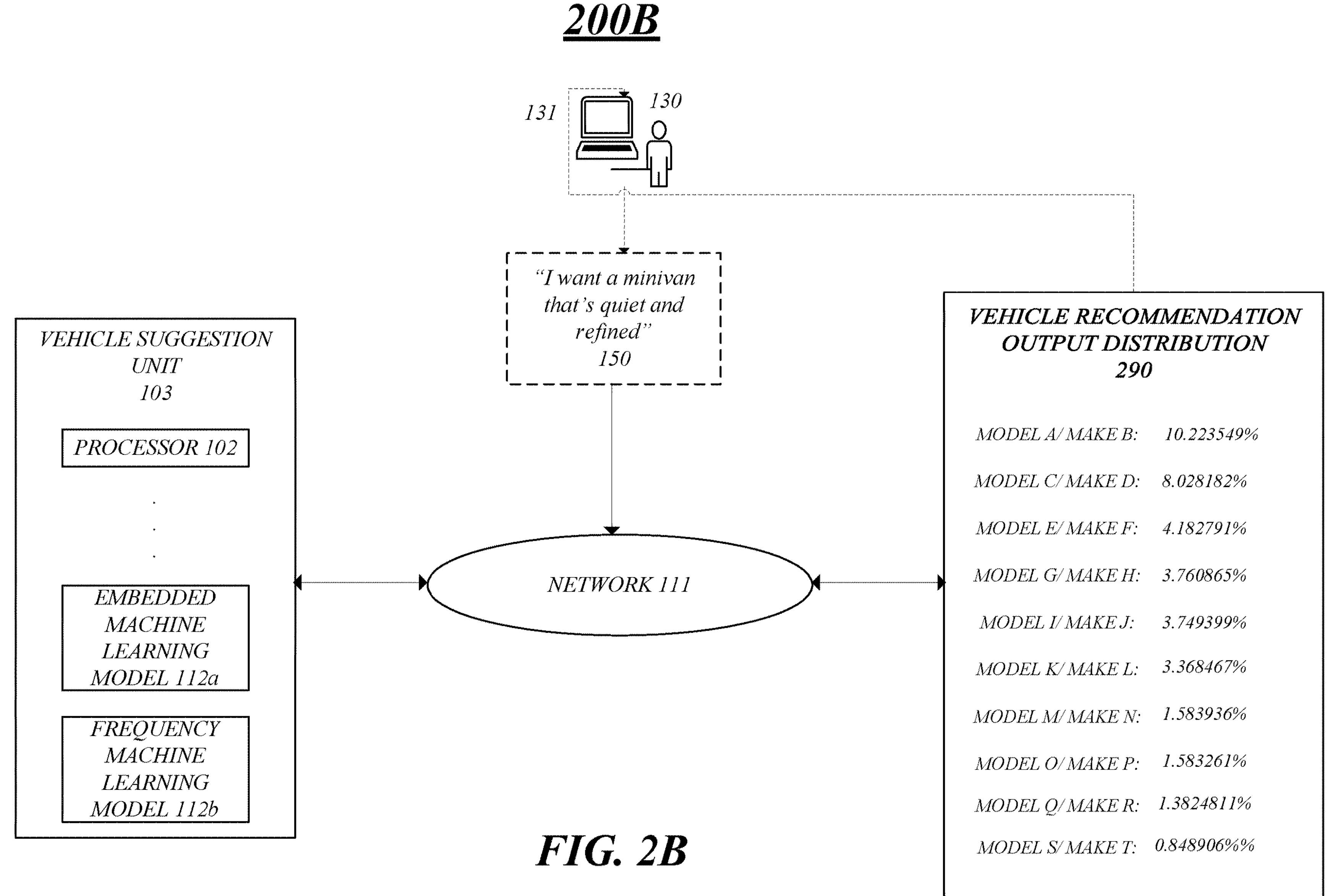

In one or more embodiments, the training component 108 of the vehicular machine learning training component 105 generates one or more suitable machine learning models that can be used to provide specific vehicle and automobile suggestions, e.g., 140, 140N, based on generic inputs, e.g., 150, 150N. In one or more embodiments, the machine learning model(s), as shown in FIG. 2A or FIG. 2B, can be either word frequency machine learning model(s) or embedded machine learning model(s). The training component 108 can train the one or more machine learning models, e.g., 112*a*, 112*b*, based on data provided by the one or more databases 120, including but not limited to the expert review vehicle database 121A and the vehicle database(s)

121B . . . 121N. For example, in one or more embodiments, the machine learning models, as discussed further with respect to FIG. 2A and FIG. 2B, can determine a relationship between generic terms contained in expert or user reviews, e.g. "a vehicle that will make your friends jealous" to a particular automobile feature, e.g. "a V-6 engine" or a make and model associated with the term, and are then able to facilitate a prediction of what specific vehicular feature is being referred to or requested based on a generic input.

In one or more embodiments, as the one or more models are trained, the one or models can determine that a particular expert or user review is referring to a particular vehicle feature or features based on previously processed data associated with other expert or user reviews in database 121A and/or 121B, which can enhance the accuracy of the model, e.g. 112*a*, 112*b*, by adding additional training steps or layers (e.g. a neural network) based on the confirmation (and before receiving any user requests) and/or the training component 108 can be configured to skip fully processing an expert or user review when generic language associated with a specific automobile feature, e.g., language referring to a specific automobile feature, and the underlying relationship associated therewith, can be determined from an already processed expert or user review. In the latter case, computer resources are preserved, and the processing speed is increased by avoiding redundancies.

In one or more embodiments, the training component 108 configures the training of the machine learning models 112*a*, 112*b* to consider additional factors, independent of the expert review vehicle database 121A. In one or more embodiments, the training component 108 can be configured to institute a feedback loop when training is completed for the machine learning models 112*a*, 112*b*, where, after being trained and being used for their intended purpose, the feedback loop enables the machine learning models 112*a*, 112*b* to consider user selection in generating a distribution of probabilities or a specific probability. For example, if, based on the training from ingestion of data associated with data sources 120, the machine learning models 112*a*, 112*b* output a particular distribution of probabilities that a particular term, e.g. "a vehicle that will make your friends jealous," is associated with one or more vehicles, actual user selection of one or more of the vehicles can adjust the overall distribution and the probability associated with the selected features for a subsequent query, e.g. when the one or more users 130 . . . 130N make a subsequent query.

In one or more embodiments, the training component 108 can provide for a user input restriction when training the machine learning models 112*a*, 112*b*. The restrictions themselves can be based on generic language, e.g. "I want an affordable car to make my friends jealous," where the vehicular machine learning training component 105 can train the machine learning models 112*a*, 112*b* based on associations with a generic term, e.g. "affordable," and the information contained in the databases 120 or the user can actually provide a specific limitation, e.g. "I want a car for less than $25,000.00 that will make my friends jealous," and the machine learning models 112*a*, 112*b* can specifically limit the probability distribution output provided to the user based on this limitation (the one or more databases 120 can include a pricing database, and the machine learning models 112*a*, 112*b* can be trained to incorporate information contained therein to establish price thresholds). Similarly, in one or more embodiments, the machine learning models 112*a*, 112*b* can be trained to interpret a generic location request or preference by a user, e.g. "I want to be able to purchase a car close to home that will make my friends jealous," based on information contained in the one or more databases 120, e.g. the one or more databases can include a national inventory of vehicles (such as cars) and the training component 108 can train the machine learning models to cross-reference the IP addresses associated with user devices, e.g. 131 . . . 131N, and exclude cars not within a certain vicinity of the IP address from the output provided to the one or more users 130 . . . 130N; or, the use request can actually specify a location, e.g. "I want to purchase a car in Columbus, OH that will make my friends jealous," and the one or more machine learning training models 112*a*, 112*b* can be similarly trained by the training component 108 to exclude cars not available at the specified locations from the output distributions.

Any variation of the above features or other suitable features, including features as discussed with reference to the description of various embodiments for the one or more databases 120, can be used as feedback or input features for the machine learning models 112*a*, 112*b* during training and/or incorporated into the protocol for providing an out to distribution to the one or more users 130 . . . 130N.

The trained machine learning models 112*a*, 112*b* can be stored in storage 110 and utilized by one or more components of the vehicle suggestion unit 103, including but not limited to the processor 102, and/or any other suitable component, unit or system as disclosed herein, where the trained machine learning models 112*a*, 112*b* can be utilized to provide a specific vehicular suggestion, including a particular make and model of a vehicle.

In one or more embodiments, the ingested texts from the expert review vehicle database 121A, and/or the user review vehicle database 121B, and/or the vehicle databases 121C . . . 121N can be pre-processed by the pre-processing component 107 before being used by the training component 108 to train the models, e.g. removing some or all of verbs, pronouns, and stop words from ingested sentences, removing sentences that are irrelevant, e.g. having nothing to do with vehicles (such as a copyright statement in an article review). In one or more embodiments, the pre-processing is valuable in both the word frequency model case and the embedded model case, as training any model with condensed and relevant material increases processing speed and training accuracy.

FIG. 2A illustrates one or more embodiments 200A for training and/or utilizing a machine learning model according to the present disclosure, including one or more embodiments for configuring and using the vehicular machine learning training component 105. In one or more embodiments of FIG. 2A, at least two tracks (or configurations) 112*aa* and 112*bb* for a machine learning model are illustrated, where 112*aa* illustrates an encoder or embeddings track/configuration and 112*bb* illustrates a word frequency-based vectorizer track/configuration. The vehicular machine learning training component 105 can, during training, train the model, e.g. 112*a* or 112*b*, to make a prediction 250 on where in the corpus of expert reviews from the expert review vehicle database 121A (and/or the user review vehicle database 121B) a particular sentence is located, e.g. vehicle prediction 250 and/or to link specific language to generic language in the databases 121A and 121B.

In one or more embodiments, the vehicular machine learning training component 105 may receive an input 205 from the one or more databases 120, e.g., the expert review vehicle database 121A, the user review vehicle database 121B, etc. The vehicular machine learning training component 105 can preprocess 210 the text before using either track 112*aa* and/or track 112*bb*. For example, if an expert review in the expert review vehicle database 121A states "equally impressive is this minivan's quiet and refined ride," then the vehicular machine learning training component 105 can remove all verbs, conjunctions, extraneous words, and reduce all inputs to root words, such that whatever machine learning configuration is applied, the input may be "equal impress quiet refine ride." In one or more embodiments where preprocessing is applied, as stated above, computational resources are reserved both when training a model and when reusing it.

In one or more embodiments, since the training of the model is done pursuant to the information in the database, e.g. expert review vehicle database 121A, user review vehicle database 121B, etc., the model is technically trained for a first use case, which is to predict what generic terms are associated with specific vehicle features in a review context; however, since the language of the reviews can be similar to the language used by users making a request, it can be applied, without further training or feedback (except as desired, e.g. feedback during use by the users), in a second use case, e.g. when used to provide a specific suggestion to a user making a generic request.

In one or more embodiments, with respect to track 112*aa*, any suitable pre-trained embeddings or encoding model(s), e.g. 220, can be used in accordance with one or more embodiments of the present disclosure, e.g. a document, sentence, word, or character embeddings models, including but not limited to the Universal Sentence Encoder (USE) and ELMo (Embeddings from Language Models) or other state-of-the-art. Any reference with respect to particular technique or techniques during training provided herein and below is intended to illustrate a non-limiting embodiment or embodiments of the present disclosure.

In one or more embodiments, the embeddings or encoding model configuration 112*aa* may involve performing a computation with respect to one or both of the ordering of words in a sentence and/or the identity of words in a sentence and performing a mathematical computation that correlates one or both of identity and spatial positioning between terms. Accordingly, in one or more embodiments, by ingesting text that has multiple generic phrases or words to describe the same vehicles, the machine learning model can determine relationships between generic terms, e.g. "envious" and "jealous" are similar, and by ingesting sentence structures that use those terms in similar locations and with a similar sentence structure in reference to specific vehicular features, the embeddings or encoding model configuration 112*aa* can determine a probability that specific vehicle features are referred to when specific generic words, bigrams, phrases, or sentences are used. For example, since generic terms can be used in multiple and distinct phrases or words to describe the same, similar, and different vehicles, the embeddings or encoding model configuration 112*aa* can output a likelihood that a particular phrase or word is associated with a particular vehicle feature or particular vehicle make and model.

In one or more embodiments, since the text contained in the one or more databases 120, including the expert review vehicle database 121A, can have a similar structure to generic terms entered by the user when making a vehicle inquiry, and since the one or more expert reviews can incorporate vehicle features and vehicle models in sentences containing the same or similar words or phrases, applying model, e.g. 112*a*, trained by the embeddings or encoding model configuration 112*aa* to a user request can provide a highly accurate suggestion in terms of the vehicle (or distribution of vehicles with associated probabilities 290 as discussed below) likely sought by the user.

In one or more embodiments, for the 112*aa* track, the pre-trained embeddings model 220 is a sentence encoder or vectorizer 220 and can be used on pre-processed text 215, where the pre-processed texts stem from the expert review vehicle database 121A or the user review vehicle database 121B. The configuration 112*aa* employing the sentence encoder 220, based on ingesting multiple phrases or words from the expert review vehicle database 121A and/or user review vehicle database 121B, can render a computation that considers both location and the identity of vehicle terms, including automobile make and models, in relation to a generic term describing the vehicle make and model. Each word, term, bigram, or phrase that contains a generic term to describe a vehicle can be vectorized in terms of identity and location in a larger phrase or sentence and compared to other generic terms to determine to mean of generic terms themselves (in the vehicle context), and each vehicle feature, e.g., a make and model, can also be vectorized in terms of location and identity in multiple sentences with generic phrases or words. From this basis, a likelihood that a phrase or word is part of a particular corpus in one or more of database 121A and/or 121B can be determined and/or the likelihood that a generic phrase or word is referring to a particular vehicle feature, such as vehicle make and model, can be determined even when the phrase or word does not refer to the specific vehicle feature.

In one or more embodiments, the encoder or vectorizer 220 outputs sentence embeddings associated with the ingested data from the expert review vehicle database 121A, and the sentence embeddings can be fed into one or more layers 225, including one or more dense layers, of a neural network, such that the network is trained according to a scheme as discussed above and provided by the encoder or vectorizer 220. In one or more embodiments, prior to feeding the neural network layer 225 with the sentence embeddings from the encoder or vectorizer 220, the sentence embeddings from the phrases or words can be summed and averaged to linearize the data set, and thus enhance efficiency when training and using the model. In one or more embodiments, since all of the inputted material from the one or more databases 120 can be selected to be related to vehicles, and particular descriptions of vehicles, e.g., expert reviews, any cost associated with accuracy is mitigated.

In one or more embodiments, with respect to track 112*aa*, the pretrained embeddings model 220 can be frozen or unfrozen, e.g., it can have weights that do not change during training or the weights can be adjustable during training (through transfer learning) as the embeddings model receives feedback from the corpus of automobile-review specific language, e.g. database 121A and/or database 121B. In one or more embodiments, whether a frozen or unfrozen approach is used, once training is completed, the model that develops from track 112*aa*, e.g. 112*a*, can be configured to update its predictions based on actual user selections. For example, if the model 112*a* is used in a use case to provide a specific vehicle recommendation based on a generic user request, as discussed with reference to FIG. 2B and elsewhere herein, a feedback mechanism that incorporates actual user selection can be incorporated therein to make adjustments to future outputs.

Accordingly, as discussed herein, in one or more embodiments, once the model associated with 112*aa* is trained, e.g. model 112*a*, the model 112*a* can be used in one or more systems as described herein to provide a specific vehicle recommendation to one or more users making a generic user request over a system with respect to a vehicle, where the recommendation can be a specific feature, a distribution of features, a specific vehicle, or a distribution of vehicles. After deriving model 112*a* as discussed above, since the language in expert or user reviews may be similar to generic language used by a user when describing or requesting a vehicle, the model predictions of 112*a* can be considered as rank-ordered suggestions, e.g. see FIG. 2B, for specific features, e.g., a specific make and model, where the highest ranking suggestion can be provided as an output to a user.

In one or more embodiments, for the 112*bb* track, a word frequency model employs a sentence vectorizer 230, e.g. a term frequency, inverse document frequency ("TF-IDF") technique, to an entire database, e.g. the expert review vehicle database 121A, to determine a relationship between a particular vehicle feature, e.g., make and model, to a particular generic word, term, bigram, phrase, or sentence. (As with track 112*aa*, the data can be pre-processed prior to vectorizing it). For example, in the case where TF-IDF is used, the number of times a generic term or word, e.g., "jealous" or bigram, e.g. "very jealous," or a phrase., e.g. "this minivan is quiet and refined", is used in the one or more of collection of expert or user reviews in one or more databases 121A and/or 121B for a particular vehicle, e.g. make/model (or a collection of reviews for other specific functional, mechanical, or aesthetic features of a vehicle), offset by a factor, e.g., the total number of expert reviews in database 121A and/or user reviews in database 121B, results in an associated mathematical representation of that frequency.

In one or more embodiments, the output of the sentence vectorizer 230 is fed into a classifier, normalizer, or any other suitable model or technique, e.g., a logistic regression scheme/model 235 to train the model 235. After training the regression model 235 as described, and deriving model 112*b* therefrom, since the language in expert or user reviews may be similar to generic language used by a user when describing or requesting a vehicle, the model predictions of 112*b* based on the frequency of generic terms, words or phrases in the requests, can be considered as rank-ordered suggestions for specific features, e.g. see FIG. 2B, a specific make and model, where the highest ranking suggestion can be provided as an output to a user.

FIG. 2B illustrates one or more embodiments for a configuration 200B using at least one component of system 100 and the machine learning models 112*a* and/or 112*b* (once trained pursuant to FIG. 2A) in the context of a user vehicle request. As shown, system 100 and the vehicle suggestion unit 103 associated therewith are condensed/modified, but system 100 and vehicle suggestion unit 103 can include all of the elements as described in FIG. 1. Although the configuration 200B shows using system 100 and portions of vehicle suggestion unit 103 in particular, any computer system configured to perform one or more operations as discussed herein and with the appropriate software or hardware component, modules, and/or units can be suitably used. In one or more embodiments, since machine learning models 112*a* and/or 112*b* can be stored in storage, e.g. 110 as shown in FIG. 1, the models 112*a* and 112*b* can be transferred, accessed, and/or used by another system.

In one or more embodiments, a user, e.g. 130, can provide an input 150 to vehicle suggestion unit 103 (via a network 111 as shown, but alternatively, directly or as otherwise suitable) with respect to a generic vehicle request, such as a car. For example, the user may input 150 "I want a minivan that's quiet and refined." Whether track 112*aa* or 112*bb* is employed during training and whether either one of the trained models 112*a* or 112*b* is employed, in one or more embodiments, the output in either scheme can be a recommendation for a particular vehicle feature, a particular make, and model, or, as shown in output 290, a ranking distribution of particular makes and models that most likely correlate with a user request containing generic vehicular language. In one or more embodiments, although not shown in FIG. 2B, the input "I want a minivan that's quiet and refined" can be processed by a suitable component, as described herein or elsewhere, e.g. in one or more training operations as shown with respect to FIG. 2A, that can reduce the input to a reduced length, thus making it more processor friendly. For example, the input 150 can be pre-processed to "minivan quiet refine" prior to processing the input 150 by either one of the models 112*a* and/or 112*b*. In one or more embodiments, the output 290 can be different based on whether model 112*a* and/or 112*b* is used, but the top results can be the same as the same corpus of expert or user reviews associated with 121A and/or 121B can be used during training of either model. In one or more embodiments, the model 112*a* and/or 112*b* produces a ranking or listing, based on the training discussed herein, of a probability from what is most likely being requested by the user to what is least likely being requested by the user, e.g. output 290, and displays it to the user via a suitable display device, e.g. 131.

Accordingly, in one or more embodiments, as shown in FIG. 2B, the ability of the one or more models 112*a* and/or 112*b* to output a specific prediction 290, where the specific prediction 290 is considered an order-ranked suggestion of the most recommended vehicle features for the user, in response to one or more user requests, e.g. 140, made through a system, e.g. system 100, is illustrated. Although as shown, once either model is trained, the actual probabilities that a vehicle type and/or feature, e.g. a make and model, is associated with a user request are actually displayed to the user, in other embodiments a simple ranking without the actual probabilities can be displayed, or the make and model with the highest probability can be displayed.

In one or more embodiments, as may be implied and stated elsewhere, since the training of the model, e.g. 112*a* or 112*b*, is done pursuant to the information in the database, e.g. expert review vehicle database 121A or user review vehicle database 121B, the model is technically trained for a first use case, which is to predict what generic terms are associated with specific vehicle features in an expert and/or user review context and/or, during training, to predict from what source particular language stems from in either database 121A and/or database 121B; however, since the language of the expert or user reviews can be similar to the language used by users making generic requests, it can be applied, without further training or feedback (except as desired, e.g. feedback during use by the users), in a second use case, e.g. when used to provide a specific suggestion to a user making a generic request.

In one or more embodiments, whatever the type of machine learning model that is used, e.g., an embedded model or a word-frequency model, the machine learning model is trained by ingesting expert or user reviews, and as such, its accuracy in the context of predicting that a specific vehicle or automobile feature, e.g., a specific car make and model, is also improved. Accordingly, in one or more embodiments, the trained machine learning model 112*a* and/or 112*b* can be used for the purpose of making predictions for the first use case, i.e., the scenarios or context associated with the material involved in training the model, e.g., that expert reviews or user reviews, whether those contained in database 121A or reviews subsequently ingested and not part of any of the information in databases 120, with utilizing particular generic language are referring to a specific vehicle or automobile feature or features. The use of the machine learning model in another context, e.g., making a specific automobile or vehicle recommendation to a user based on a generic language input request provided by the user, is a second use case, and whatever type of machine learning model is trained and useable according to a first use case, e.g. predicting that generic expert review language for automobiles and/or vehicles is associated with specific automobile or vehicle features, is applied to this second use case.

FIG. 3A illustrates an example of a logic flow 300A that may be representative of some or all of the operations executed by one or more embodiments described herein. For example, the logic flow 300A may illustrate operations performed by a vehicular suggestion system to provide a specific recommendation to a vehicle request by a user, where the request contains only generic language.

At block 305, one or more embodiments may include receiving a generic vehicle or automobile request from a user, including generic language with respect to a preferred automobile characteristic or feature, e.g. "a spacious van," "a car to make everyone jealous," "a car with umph," etc. The vehicular suggestion system can utilize this request to assist the user in making a decision, e.g., selecting a particular car. The user request can be received by the system via a chatbot dialog communicating with the user, where the chatbot asks the user generic questions, e.g., "what car are you interested in," and the user indicates a general preference feature, e.g., "I want a car with a sweet ride." Alternatively, in one or more embodiments, the request can be made by the user inputting the request in a single search field of a query system, such as a search engine or a search box associated with a website, or through multiple search fields of the same.

At block 310, one or more embodiments include applying a machine learning model (MLM) to the received user request. The machine learning model can be trained by processing data from one or more vehicle databases, where the databases can include pricing information for vehicles, functional attributes for vehicles, location of specific vehicles and the general availability of specific vehicles in certain areas, and expert reviews that use generic language to describe specific vehicle features, including particular makes and models. In one or more embodiments, the vehicles are cars, and the information contained in the one or more databases are associated with cars. Based on the training determined by the data in the one or more databases, the MLM can be trained to associate one or more specific automobile types in relation to generic automobile language, as the data used to train the database can contain generic language similar to what a user, e.g., consumer, would use in describing a vehicle, where the language was associated with a specific vehicle type.

In one example, the machine learning model can be an embeddings model that was trained by processing sentences in an expert or user review vehicle database and determining relationships between car makes and models and generic phrases or words based on the structural nature of the sentences contained in the database. In another example, the machine learning model can be a word frequency model that was trained to associate the frequency of a particular make and model (or makes and models) in association with generic phrases or words contained in one or more user or expert reviews contained in the database. In one or more embodiments, the model can be a frozen model that is incapable of adjusting itself once trained, and in other embodiments the model can be unfrozen, capable of adjusting its determinations based on processing information after its initial training, including user feedback, e.g., ultimate selections made by a user after the model supplied a suggestion.

At block 315, one or more embodiments include generating, by the MLM or based on results derived using the MLM, a recommendation for at least one specific vehicle or automobile feature based on the generic automobile request. The recommended specific vehicle feature can be any specific mechanical, aesthetic, or functional feature associated with a vehicle. In one embodiment, the recommendation is a specific car make and model, and in one embodiment the recommendation is a specific distribution or ranking of multiple car makes and models.

Accordingly, in one or more embodiments, the MLM is technically trained according to a first use case, which is to predict that generic language is associated with a specific vehicle or automobile feature in the context of expert reviews, but it is applied in terms of a second use case, e.g. providing a specific recommendation to a user in response to a generic automobile or vehicle request.

At block 320, one or more embodiments include updating the MLM, after training, based on an ultimate selection made by the user in terms of a specific vehicle or automobile feature, where in one or more embodiments this enables the MLM to adjust its output when a subsequent generic request is made by the same or other user.

Figure 3B:
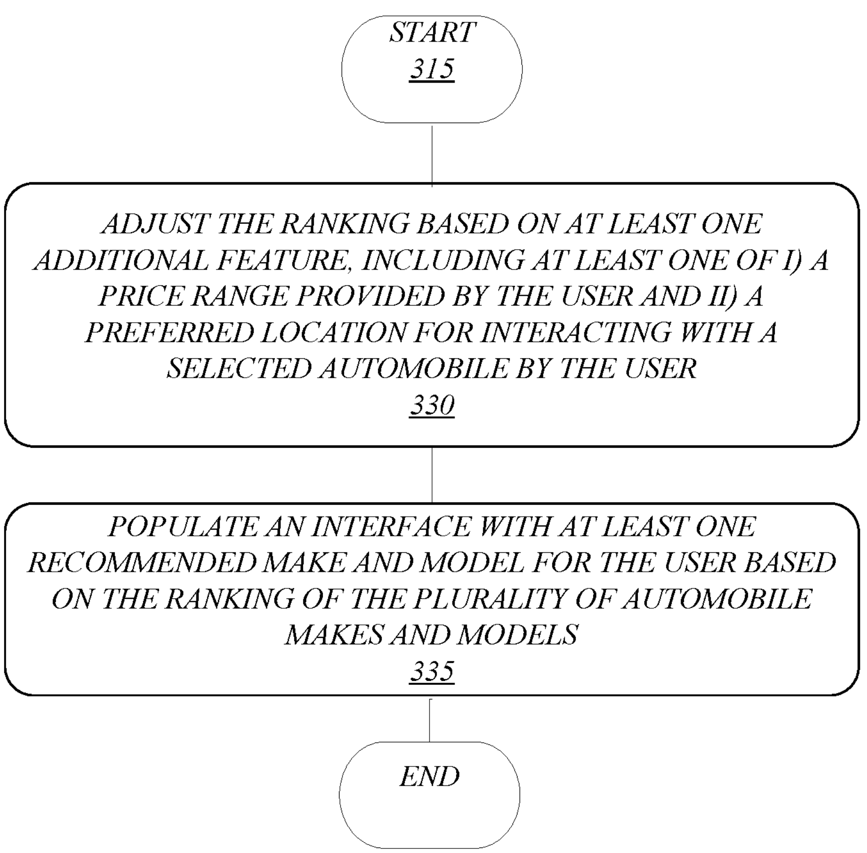
FIG. 3A/3B illustrate examples of one or more processing flows for providing a vehicular recommendation according to at least one embodiment of the present disclosure.

FIG. 3B illustrates an example of a logic flow 300B that may be representative of some or all of the operations executed by one or more embodiments described herein. For example, the logic flow 300B may illustrate operations performed by a vehicular suggestion system to provide a specific recommendation to a vehicle request by a user, where the request contains only generic language.

In one or more embodiments, the flow begins at block 315 of FIG. 3A. In one or more embodiments, the logic flow 300B, at block 330, includes adjusting the ranking based on a specific user-requested feature or input. In one or more embodiments, the generated suggestion of block 315 is made only after considering the specific input or inputs provided by the user, and an adjustment of a generated request is avoided. For example, the user can indicate one or more specific preferences and make specific choice restrictions at the onset, e.g., the user may request that a vehicle or automobile have a specific mechanical feature, e.g. "V4 engine," be within a certain price range "less than thirty-thousand dollars," or available at a certain location or within a certain radius, e.g. "within a thirty-mile radius of Columbus, Ohio."

In one or more embodiments, one or more components of a system (as discussed herein) can alter the output of the MLM to exclude vehicles or automobiles that do not have the requested feature, where the one or more components can use one or more thresholds or matching functions to compare the MLM results to information contained in the expert reviews, or in other databases, e.g. pricing databases, as needed. In another example, the MLM model can be trained to limit its range of responses based on certain keywords, e.g., a price range is associated with a certain weight in a network that necessitates a certain outcome, e.g., zero probability as an output for the specific phrase. These examples are non-limiting, and other configurations and schemes are possible.

At block 335, one or more embodiments include populating an interface or display with at least one recommended vehicular or automotive feature, e.g. a make and model for the requesting user based on an output of the MLM, including a ranking or ordering by probability that the generic request is associated with a specific make and model. In one example, where the user is communicating with a chatbot employing a system that uses at least one machine learning language technique as discussed herein, the output can be in the form of a response from the chatbot and displayed to the user on a computer display. Similarly, in another embodiment, the output can be displayed to the user through any other suitable interface, including as a set of search results or a single field or multiple fields with text therein.

FIG. 4 illustrates an example of a logic flow 400 that may be representative of some or all of the operations executed by one or more embodiments described herein. For example, the logic flow 400 may illustrate operations performed by a vehicular suggestion system to provide a specific recommendation to a vehicle request by a user, where the request contains only generic language.

At block 410, one or more embodiments include receiving at least a first data set and at least a second data set, where the first data set, and the second data set can be from a corpus of one or more expert automobile reviews, and a corpus one or more user reviews. In an example, both the first data set, and the second data set are from the same type of review database, e.g. an expert review data set, and in another embodiment the first data set is an expert review data set and the second data set is a user review data set (or vice versa). Each of the first data set and the second data set can include generic text related to automobile makes and models, e.g., multiple and different kinds of cars by make and model, and at least one specific text related to at least one feature of at least one of the automobile makes and models. The at least one feature can be referencing the automobile make and model or an aesthetic, mechanical, or functional feature associated therewith. For example, the text of one of the reviews, e.g. an expert review, may state "Model A of make B will make your friends envious," where "make your friends envious" is generic and the specific reference to "Model A of make B" is a specific text of at least one feature. In another example, the review, e.g. a user review, may state "My Model A of make B is roomy and spacious because its trunk has 10 square-feet of storage space," where the reference to "Model A of make B" is one feature and "because its trunks has 10 square-feet of storage space" is another feature and "roomy and spacious" is generic text. Accordingly, in one or more embodiments more than one type of review can be employed and more than one specific feature of the automobile can be described in relation to the generic text and/or the phrase associated therewith.

At block 420, one or more embodiments include pre-processing the first data set and second data set to include sentences from a corpus of reviews (solely expert reviews, solely user reviews and/or a combination), and removing all verbs, pronouns, and stop words from the plurality of sentence. The pre-processing can be carried out as discussed herein or as otherwise suitable for a particular application or task.

At block 425, one or more embodiments include generating a machine learning model (MLM) based on the first data set and the second data set. In one or more embodiments, the MLM is trained to predict one or more specific automobile makes and models in relation to generic automobile text by analyzing a relationship between the generic text of the corpus of one or more automobile reviews and the specific text of the corpus of one or more automobile reviews; and similarly the MLM is trained to predict one or more specific automobile makes and models in relation to generic automobile text by analyzing a relationship between the generic text of the corpus of one or more user automobile reviews and the specific text of the corpus of one or more user automobile reviews.

In one or more embodiments, the processing of the first data set enhances the ability of the MLM to make a prediction with respect to the second data set, e.g. if both are of the same type of data sets then the MLM, during training, can predict the location of the material of the second data set in an associated part of a corpus of reviews (or database of reviews). In one or more embodiments, whether the first dataset and the second dataset are associated with different kinds of reviews or the same kind of reviews, the processing of the first data set enhances the ability of the MLM to make a prediction with respect to generic language in association with specific language of the second data set, e.g. at least because the same topic is being discussed regarding a vehicular or automotive feature. In one or more embodiments, the processing of the second data set enhances the overall predictive ability of the MLM with respect to the context of making predictions in vehicular reviews and/or to provide specific suggestions to a user in response to a generic user request. As such, in one or more embodiments, the MLM can be useful in a first use case as result of the training, e.g. making predictions in the context of vehicular reviews, and can be used in a second use case, e.g. to provide specific suggestions to a user in response to a generic user request.

Accordingly, in one or more embodiments, the processing of the first data set can enhance the accuracy of the predictive capacity of the MLM with respect to a first use case, e.g. enhancing the prediction of a specific automobile make and model associated with language contained in other expert reviews, or the second data set, which relates to automobile reviews, but with respect to users, while also enabling the MLM to be useful in a second use case (without further training), where the second use case (as discussed in greater detail with respect to block 430) can be any use case where the text or content involved therein has a similarity to expert or user car reviews, including but not limited to, as discussed above, providing a suggestion or prediction for a specific automobile or vehicular feature to a user making a generic request. In one or more embodiments, the processing of the second set also increases the accuracy of the MLM with respect to the first use case and/or a second use case.

The MLM models associated with one or more embodiments of logic flow 400 can be any suitable MLM model, including MLM models discussed herein, e.g., word-frequency or embedded schemes that are frozen or unfrozen, or any other suitable scheme.

At block 430, one or more embodiments include receiving a third data set that is distinct from both the first data set and the second data set. In one or more embodiments, as suggested above, the first data set and the second data set are part of the same use case, e.g., automobile expert or user reviews and predictions concerning generic language in relation to specific automotive features regarding the same. In one or more embodiments, the third data set includes a generic automobile text, where the generic automobile text contains a preference of a user expressed in generic terms, e.g., an automobile for "making a ride comfortable." Although not expressly shown in flow 400, the text or data associated with the third data set can also be pre-processed as discussed herein or otherwise suitable for a particular task or application.

At block 435, one or more embodiments include predicting a specific automobile make and model corresponding to the generic automobile text of the third data set using the MLM model. The prediction can be of a type, and/or in accordance with any of the techniques and facilitated by any one of the one or more components or systems, as already (or subsequently) discussed herein. In one or more embodiments, although not expressly shown in flow 400, as already suggested and described herein, a selection made by a user, (e.g., a user-selected automobile after the user receives the suggestion by the system) can be incorporated as feedback into the MLM and/or the request could be restricted at the onset by user conditions associated with the request (as already or to be subsequently discussed).

At block 440, one or more embodiments include providing an interface for another user or users, distinct from the user associated with the third data set, to enter a generic automobile preference, where the interface includes a single field for entering an entirety of the generic automobile preference. The single field can be a field provided by a chatbot dialog or a single field in a search engine or searching function associated with a web page. At block 445, the subsequent user or users can enter the generic request, which contains generic language for an automobile preference, via the interface.

At block 450, one or more embodiments include generating a specific automobile suggestion for another user based on the request and by using the trained MLM. In one or more embodiments, the generated automobile suggestion can include a specific automobile make and type suggestion, e.g., a suggestion that a user select or purchase a specific automobile make and model or the output can be a distribution of specific automobile makes and models that the user can consider purchasing, where the distribution is ranked by a basis of the likelihood that a particular make and model is what the subsequently requesting user or users are interested in (as a selection or purchase). In one or more embodiments, the output is affected by a selection made by the user or users associated with the third data set, and in accordance with a feedback scheme as already or subsequently discussed herein or as may otherwise be suitable.

At block 455, one or more embodiments include displaying the output results to the one or more users on a computer device and using any techniques, schemes, components, or mechanisms as previously or to be subsequently discussed herein.

Figure 5:
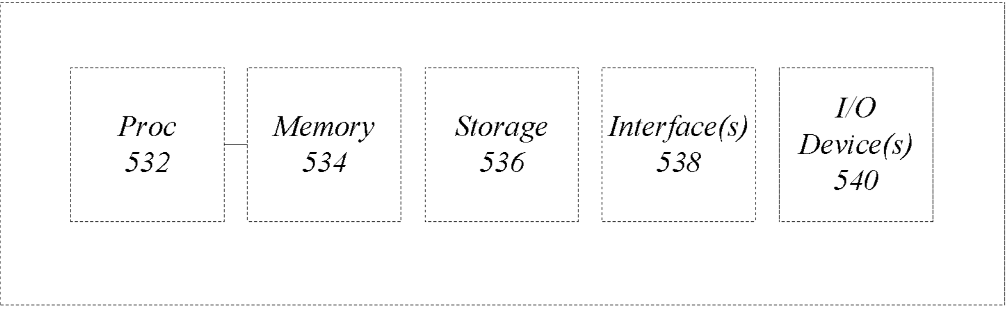
FIG. 5 illustrates a machine learning system according to an embodiment of the present disclosure

FIG. 5 illustrates an example of a vehicular suggestion system 506. The vehicular suggestion system 506 includes one or more processor(s) 532, memory 534, storage 536, one or more interface(s) 538, and one or more I/O device(s) 540.

In embodiments, the vehicular suggestion system 506 may be a processing system that includes one or more servers or computing devices that are interconnected via one or more network links, e.g., wired, wireless, fiber, etc. In some instances, the transaction services system may be a distributed computing system. Each of the servers may include one or more processor(s) 532, which may include one or more processing cores to process information and data. Moreover, the one or more processors 532 can include one or more processing devices, such as a microprocessor manufactured by Intel™, AMD™, or any of various processors. The disclosed embodiments are not limited to any type of processor(s).

Memory 534 can include one or more memory (volatile or non-volatile) devices configured to store instructions used by the one or more processors 532 to perform one or more operations consistent with the disclosed embodiments. For example, memory 534 can be configured with one or more software instructions, such as programs that can perform one or more operations when executed by the one or more processors 532.

The disclosed embodiments are not limited to separate programs or computers configured to perform dedicated tasks. For example, memory 534 can include a single program that performs the operations or could comprise multiple programs. Memory 534 can also store data that can reflect any type of information in any format that the system can use to perform operations consistent with the disclosed embodiments.

In embodiments, the transaction services system 504 may include one or more storage devices 536. The storage devices 536 may include HDDs, flash memory devices, optical storage devices, floppy storage devices, etc. In some instances, the storage devices 556 may include cloud-based storage devices that may be accessed via a network interface. In some embodiments, the storage 536 may be configured to store one or more databases and/or as a distributed database system to store information and data. Databases can include one or more memory devices that store information and are accessed and/or managed through the transaction services system 504. By way of example, databases can include Oracle™ databases, Sybase™ databases, or other relational databases or non-relational databases, such as Hadoop sequence files, HBase, or Cassandra. The databases or other files can include, for example, data and information related to the source and destination of a network request, the data contained in the request, transaction information, etc. Systems and methods of disclosed embodiments, however, are not limited to separate databases. In one aspect, transaction services system 504 can include databases located remotely from other transaction services system 504 devices. The databases can include computing components (e.g., database management system, database server, etc.) configured to receive and process requests for data stored in memory devices of databases and to provide data from databases.

Figure 6:
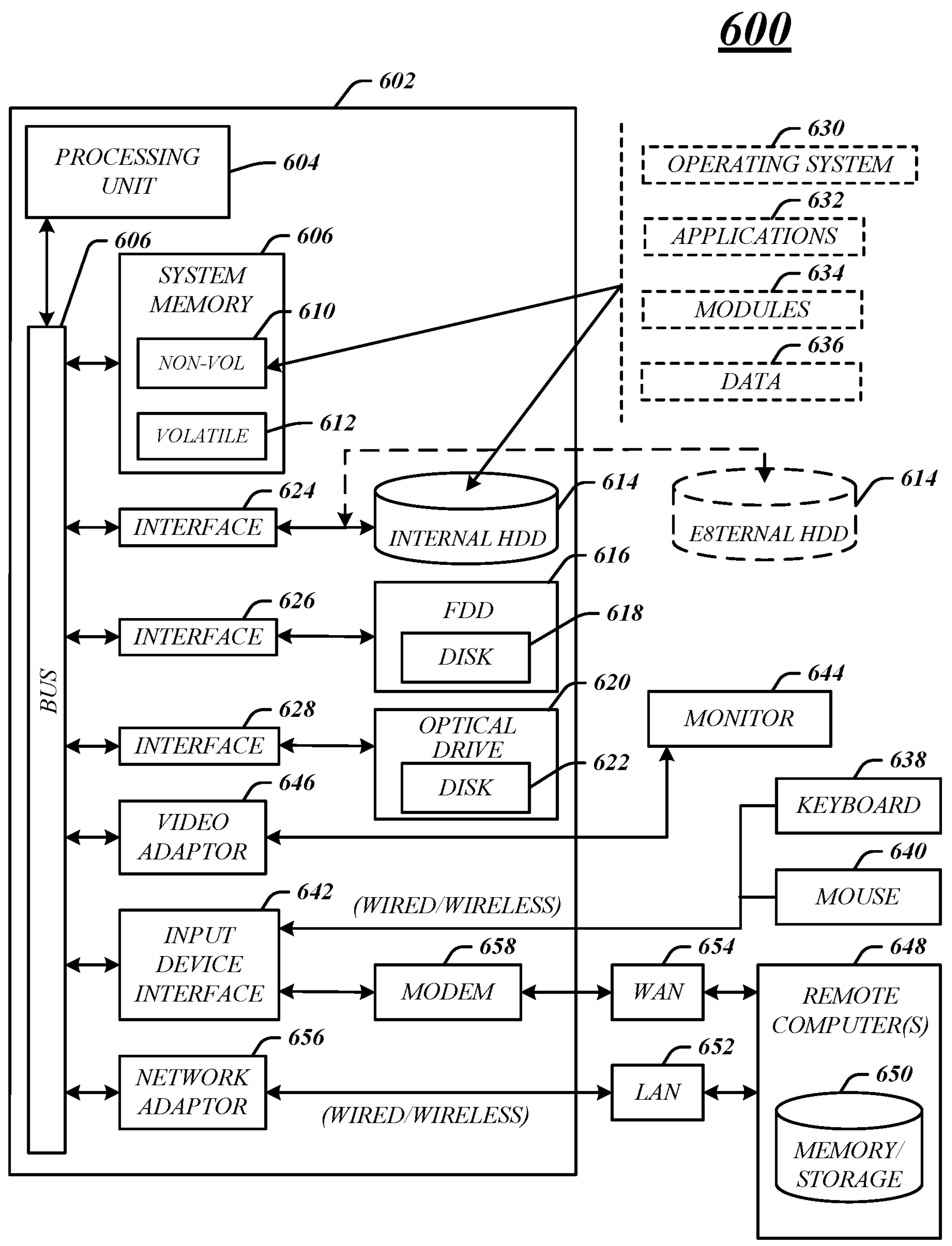
FIG. 6 illustrates an embodiment of a computing architecture useful with at least one embodiment of the present disclosure.

FIG. 6 illustrates an embodiment of an exemplary computing architecture 600 suitable for implementing various embodiments as previously described. In one embodiment, the computing architecture 600 may include or be implemented as part of system 100.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically crasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 700.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, gamepads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608 but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 602 family of standards, such as wireless devices operatively disposed in wireless communication (e.g., IEEE 602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 602.118 (a, b, g, n, etc.) to provide secure, reliable, fast wireless connectivity. A Wi-Fi network can be used to connect computers to each other, to the Internet, and to wire networks (which use IEEE 602.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

FIG. 7 is a block diagram depicting an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700, which may be consistent with system 100.

As shown in FIG. 7, the communications architecture 700 includes one or more clients 702 and servers 704. The servers 704 may implement the server device 526. The clients 702 and the servers 704 are operatively connected to one or more respective client data stores 706 and server data stores 707 that can be employed to store information local to the respective clients 702 and servers 704, such as cookies and/or associated contextual information.

The clients 702 and the servers 704 may communicate information between each other using a communication framework 710. The communications framework 710 may implement any well-known communications techniques and protocols. The communications framework 710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 710 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 702.7a-x network interfaces, IEEE 702.16 network interfaces, IEEE 702.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments of systems, computer program products, methods, and techniques for training and using MLMs in the vehicular context are provided above and herein. However, at least one of the above embodiments could be adjusted and applied to any product or service that is associated with reviews, including expert or user reviews, including but not limited to real estate, video games, sporting equipment, books, and media, etc. ("other product and/or service"). In at least one embodiment, the MLM or MLMs, as employed by associated systems, components, methods, and techniques, would be trained as discussed herein, with at least one adjustment, i.e. that training of an MLM or MLMs would be from a source, e.g. review databases and datasets associated with the other product and/or service (where the sources have generic language in association with specific features associated with the other product and/or service). In at least one embodiment, the MLM trained from the review sources associated with that other product and/or service could be used to provide a specific feature suggestion with respect to that other product and/or service to a user making a generic request with respect to that other product and/or service. In at least one embodiment, the generic request with respect to the other product and/or service can be received by a single interface as discussed herein and the MLM can have feedback adjustments (e.g. based on user selection) as discussed herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:

accessing, by a processor, a first data set and a second data set from a corpus of one or more automobile reviews, the first data set and the second data set comprising generic text related to a plurality of automobile makes and models and specific text related to at least one feature of at least one of the plurality of automobile makes and models;

generating, by a machine learning model (MLM) executing on the processor, a respective probability distribution for one or more specific automobile makes and models in relation to generic automobile text by analyzing a relationship between the generic text of the corpus of one or more automobile reviews and the specific text of the corpus of one or more automobile reviews, wherein the respective probability distribution is based on a probability that a particular vehicle feature is referred to when one or more generic words are used;

receiving, by the processor, a third data set comprising a generic automobile text and a preferred specific automobile feature, the generic automobile text and the preferred specific automobile feature each comprising a preference of an account; and generating, by the MLM, a recommendation comprising a specific automobile make and model corresponding to the generic automobile text and the preferred specific automobile feature of the third data set, the recommendation based on the probability distribution for the specific automobile make and model.

2. The method of claim 1, wherein the MLM is trained based at least in part on the first data set.

3. The method of claim 2, wherein the MLM is a transfer learning model trained by a first use type for predicting at least one generic term in a review of at least one specific vehicle feature, wherein the first use type is associated with the first data set and the second data set, wherein the first use type is reused on the third data set, wherein the third data set is associated with a second use type that is distinct from the first use type.

4. The method of claim 1, wherein the generic text of the corpus of one or more automobile reviews is related to the specific text of the corpus of the one or more automobile reviews.

5. The method of claim 1, further comprising:

pre-processing the first data set and the second data set to: (i) include a plurality of sentences from the corpus of automobile reviews, and (ii) remove predetermined verbs, pronouns, and stop words from the plurality of sentences.

6. The method of claim 5, wherein the pre-processed first data set and second data set are further pre-processed by a word frequency-based sentence vectorizer that is part of the MLM.

7. The method of claim 5, wherein the MLM is an embedded MLM, wherein at least a portion of the pre-processing is performed by a sentence encoder that is part of the MLM.

8. The method of claim 1, further comprising:

updating the MLM based on an adjustment to the probability distribution for the specific automobile make and model as a result of input specifying a preference for the specific automobile make and model.

9. The method of claim 1, wherein the generic automobile text is received via a graphical user interface (GUI).

10. The method of claim 1, wherein analyzing the relationship between the generic text of the corpus of one or more automobile reviews and the specific text of the corpus of one or more automobile reviews includes determining an indicator of an ordering of the generic text and/or the specific text in a sentence.

11. A non-transitory computer-readable storage medium, the computer-readable storage medium including instructions that when executed by a processor, cause the processor to:

access a first data set and a second data set from a corpus of one or more automobile reviews, the first data set and the second data set comprising generic text related to a plurality of automobile makes and models and specific text related to at least one feature of at least one of the plurality of automobile makes and models;

generate, by a machine learning model (MLM), a respective probability distribution for one or more specific automobile makes and models in relation to generic automobile text by analyzing a relationship between the generic text of the corpus of one or more automobile reviews and the specific text of the corpus of one or more automobile reviews, wherein the respective probability distribution is based on a probability that a particular vehicle feature is referred to when one or more generic words are used;

receive a third data set comprising a generic automobile text and a preferred specific automobile feature, the generic automobile text and the preferred specific automobile feature each comprising a preference of an account; and generate, by the MLM, a recommendation comprising a specific automobile make and model corresponding to the generic automobile text and the preferred specific automobile feature of the third data set, the recommendation based on the probability distribution for the specific automobile make and model.

12. The computer-readable storage medium of claim 11, wherein the MLM is trained based at least in part on the first data set.

13. The computer-readable storage medium of claim 12, wherein the MLM is a transfer learn model trained by a first use type for predicting a location of a sentence in the corpus of one or more automobile reviews, wherein the first use type is associated with the first data set and the second data set, wherein the first use type is reused on the third data set, wherein the third data set is associated with a second use type that is distinct from the first use type.

14. The computer-readable storage medium of claim 11, wherein the generic text of the corpus of one or more automobile reviews is related to the specific text of the corpus of the one or more automobile reviews.

15. The computer-readable storage medium of claim 11, wherein the instructions further cause the processor to:

pre-process the first data set and the second data set to: (i) include a plurality of sentences from the corpus of automobile reviews, and (ii) remove predetermined verbs, pronouns, and stop words from the plurality of sentences.

16. The computer-readable storage medium of claim 11, wherein the instructions further cause the processor to:

update the MLM based on an adjustment to the probability distribution for the specific automobile make and model as a result of input specifying a preference for the specific automobile make and model.

17. The computer-readable storage medium of claim 11, wherein analyzing the relationship between the generic text of the corpus of one or more automobile reviews and the specific text of the corpus of one or more automobile reviews includes determining an indicator of an ordering of the generic text and/or the specific text in a sentence.

18. A computing apparatus comprising:

a processor; and a memory storing instructions that, when executed by the processor, cause the processor to:

access a first data set and a second data set from a corpus of one or more automobile reviews, the first data set and the second data set comprising generic text related to a plurality of automobile makes and models and specific text related to at least one feature of at least one of the plurality of automobile makes and models;

generate, by a machine learning model (MLM), a respective probability distribution for one or more specific automobile makes and models in relation to generic automobile text by analyzing a relationship between the generic text of the corpus of one or more automobile reviews and the specific text of the corpus of one or more automobile reviews, wherein the respective probability distribution is based on a probability that a particular vehicle feature is referred to when one or more generic words are used;

receive a third data set comprising a generic automobile text and a preferred specific automobile feature, the generic automobile text and the preferred specific automobile feature each comprising a preference of an account; and generate, by the MLM, a recommendation comprising a specific automobile make and model corresponding to the generic automobile text and the preferred specific automobile feature of the third data set, the recommendation based on the probability distribution for the specific automobile make and model.

19. The computing apparatus of claim 18, wherein the MLM is trained based at least in part on the first data set.

20. The computing apparatus of claim 19, wherein the MLM is a transfer learn model trained by a first use type for predicting at least one generic term in a review of at least one specific vehicle feature, wherein the first use type is associated with the first data set and the second data set, wherein the first use type is reused on the third data set, wherein the third data set is associated with a second use type that is distinct from the first use type.

21. The computing apparatus of claim 18, wherein the generic text of the corpus of one or more automobile reviews is related to the specific text of the corpus of the one or more automobile reviews.

22. The computing apparatus of claim 18, wherein the instructions further cause the processor to:

pre-process the first data set and the second data set to: (i) include a plurality of sentences from the corpus of automobile reviews, and (ii) remove predetermined verbs, pronouns, and stop words from the plurality of sentences.

23. The computing apparatus of claim 18, wherein the corpus of one or more automobile reviews are from one or more sources unassociated with the account.

* * * * *